United States Patent [19]

Montgomery et al.

[11] Patent Number: 5,354,456
[45] Date of Patent: Oct. 11, 1994

[54] METHOD OF CONTROLLING POROSITY OF WELL FLUID BLOCKING LAYERS AND CORRESPONDING ACID SOLUBLE MINERAL FIBER WELL FACING PRODUCT

[76] Inventors: Frank Montgomery, P.O. Box 2354, Casper, Wyo. 82602; Steve Montgomery; Paul Stephens, both of P.O. Box 31853, Lafayette, La. 70593

[21] Appl. No.: 40,928

[22] Filed: Mar. 26, 1993

Related U.S. Application Data

[62] Division of Ser. No. 870,346, Apr. 17, 1992, Pat. No. 5,222,558.

[51] Int. Cl.$^5$ ............................................. B01D 39/20
[52] U.S. Cl. .................................. 210/170; 210/496; 210/510.1; 166/278
[58] Field of Search ................ 166/278, 281, 292, 294, 166/295; 252/8.551; 210/170, 435, 496, 500.1, 503, 504, 505, 506, 508, 509, 510.1

[56] References Cited

U.S. PATENT DOCUMENTS

| | | |
|---|---|---|
| 2,353,372 | 7/1944 | Stone . |
| 2,502,191 | 3/1950 | Williams . |
| 3,306,355 | 2/1967 | Maly . |
| 3,547,194 | 12/1970 | Morine . |
| 3,979,217 | 9/1976 | Sutton ................................ 264/101 |
| 4,101,425 | 7/1978 | Young et al. . |
| 4,101,426 | 7/1978 | Maly et al. . |
| 4,703,803 | 11/1987 | Blumer . |
| 5,145,806 | 9/1992 | Shirakawa et al. .............. 210/510.1 |
| 5,225,276 | 7/1993 | Akiba et al. ....................... 210/510.1 |
| 5,227,342 | 7/1993 | Anderson et al. ................ 210/510.1 |

*Primary Examiner*—Robert A. Dawson
*Assistant Examiner*—W. L. Walker
*Attorney, Agent, or Firm*—Laurence R. Brown

[57] ABSTRACT

A method of control of the porosity of wells with a fibrous fluid blocking layer disposed on formation faces is provided. By means of mineral fiber pellets of critical dimensions wherein the mineral fibers are highly soluble in acid, a fluid blocking layer formed of semi-dispersed pellets can bridge formation face pores subject to removal at will by acid treatment. Thus after well rework the plugging layer is treated by an acid solution after sealing the formation faces to prevent fluid losses to quickly dissolve the mineral fibers to the desired extent for control the porosity. A novel well workover product making the method possible is formed from raw material clinkers of highly acid soluble mineral fibers of between 5 to 15 microns in diameter by grinding in a hammermill into pellets of a range of 1/32 inch to ⅛ inch in diameter with an average being between 1/16 inch to ⅛ inch and with fiber lengths between 1/64 inch to ⅜ inch. The product has other uses in finishing wells, retaining sand geological formation faces and controlling hydraulic stress. Very little production is lost from a well reworked with this product after removal by acid treatment.

1 Claim, No Drawings

METHOD OF CONTROLLING POROSITY OF WELL FLUID BLOCKING LAYERS AND CORRESPONDING ACID SOLUBLE MINERAL FIBER WELL FACING PRODUCT

This application is a division of application Ser. No. 07/870,346, filed Apr. 17, 1992, now U.S. Pat. No. 5,222,558.

TECHNICAL FIELD

This invention relates to fluid blocking layers on geological formation faces, such as sand, in well bores, and more particularly it relates to control of well porosity by selectively dissolving highly acid soluble mineral fibers in fluid blocking layers with downwell acid solutions.

BACKGROUND ART

The art of finishing and reworking wells by restraining the passage of fluid from well holes into formation faces by means of compounds, cements or fillers forming filter masses is well known, as evidenced for example by U. S. Pat. Nos. of: J. B. Stone, 2,353,372, Jul. 11, 1944 for Method of Preventing Fluid Loss from Well Holes into the Surrounding Earth; G. F. Williams, 2,502,191, for Method of Preventing Loss of Liquid from a Well Hole in the Earth; and G. P. Maly, 3,306,355, Feb. 28, 1967 for Formation Consolidation.

Thus, silicates, gravel, salt and calcium carbonate filled resin and like organic compound mixtures have been known in the prior art for sealing formation faces to prevent loss of fluids from a well casing. However a general and critical deficiency of these products is that once a sealing surface has been put into place, it is difficult to restore the sealed formation faces into a porous condition optimized for the output flow of liquids from the well after reworking. A similar problem in finishing a well is to produce a desired porosity for hydraulic stress purposes.

It is therefore an object of this invention to provide improved materials for plugging or matting geological formation faces and methods of restoring and controlling porosity in filter packs while processing wells.

Various prior art treatments for formation faces in the geological structure about the well casing with the objectives of controlling porosity for injection or withdrawal of fluids are known. For example there are methods for acid treatment of the geological structure to improve porosity. Thus, for example, organic material is removed from the siliceous geological formations by treatment with polyphosphoric acid with an objective of avoiding objectionable residues by D. C. Young, et al. in U.S. Pat. No. 4,101,425, Jul. 18, 1978 for Non-aqueous Acid Emulsion Composition and Method for Acid-treating Siliceous Geological Formations. The siliceous material in the geological structure is very slowly dissolved by low concentrations of acid to improve porosity by D. J. Blumer in U.S. Pat. No. 4,703,803, Nov. 3, 1987 for Composition and Method for Slowly Dissolving Siliceous Material and G. P. Maly, et al. in U.S. Pat. No. 4,101,426, Jul. 18, 1978 for Acid Composition and Method for Acid Treating Geological Formations. Also contaminants in gravel are treated with acids by J. T. Morine, U.S. Pat. No. 3,547,194, Dec. 15, 1970 for Method of Cleaning Gravel Packed, Gravel Developed and Drilled Igneous Wells.

None of these acid treatment methods however could be directed at treatment of the sealing surface produced on the formation faces after well reworking to establish an optimum permeability however, because the sealing surface materials are not generally acid soluble. Even in the use of impure packing grade calcium carbonate as a plugging material, acid solubility could not be controlled in a predictable manner to derive a controlled amount of surface porosity, and additionally leaves undesired contaminant residue.

It is accordingly an object of the present invention to provide acid soluble plugging and filtering materials for treating geological formation faces and methods of treating those sealing surfaces produced on the formation faces for control of permeability, such as by unplugging wells after the rework cycle to restore a desired production capacity through the geological formation face.

Other objects, features and advantages will be found throughout the following description and claims.

DISCLOSURE OF THE INVENTION

This invention introduces a mineral fiber plugging and filtering product for use with or without conventional sealing polymers, colloids, etc. to produce a fibrous sealing mat on formation faces for treatment of wells. The product is critically dimensioned for compatibility with the sealing of formation faces of different constituency, including sand and gravel, and for reestablishing production in the well after workover. Thus, the mineral fiber is highly acid soluble and leaves no undesired residue, so that the sealing mat may be treated with acid after workover to quickly dissolve the mineral fibers in the sealing mat and thus to create control of the degree of porousness of the resulting formation face. Substantially full production may be realized after workover by removal of the acid solvent plugging layer.

THE PREFERRED EMBODIMENT

The preferred highly acid soluble mineral fiber workover plugging product provided by this invention typically has as major constituents about 35.7% CaO, 9.6% MgO, 9.3% $Al_2O_3$ and 42.3% $SiO_2$. This product is highly soluble in HCl forming a soluble silicic acid from the $SiO^2$ which is suspended in the HCl until after a very long time when a residual silica gel may form and drop out of solution. In a blend of 15% HCl and 10% acetic acid, the silica gel does not form or drop out of the solution. Thus a quick method of acid wash scavenging removes as much of the fibrous network in the sealing mat as desired to establish a porous formation face of predetermined permeability.

The mineral fiber of this constituency may be obtained as a raw material from U.S. Gypsum, for example, as a fired or sintered mineral fiber product in the form of large clumps or clinkers. However, this invention processes the raw product for critically dimensioning a workover product into pellets that can be poured and mixed with the other filter mat binders, thus to be directly usable on the formation faces, including sand or gravel and with fiber characteristics ideally suited for reestablishing and controlling porosity after reworking. Also the critically sized fibers are coated with a surfactant such as Synperonic-N nonyl phenol ethoxylate to assure wetting with the other sealing surface ingredients.

EXAMPLE 1

A typical chemical analysis of the composition of the raw fiber material is as follows:

| Constituents | % by Weight |
| --- | --- |
| $SiO_2$ | 38–42 |
| $Al_2O_3$ | 6–15 |
| CaO | 15–38 |
| MgO | 6–15 |
| $Fe_2O_3$ | 0.2–15 |
| Total Alkalies as $Na_2O$ | 1–3 |
| $SO_3$ | .03–1 |
| Loss on ignition | 0.5 |
| pH in Water | <8.0 |
| % water soluble | <0.2 |
| Water soluble sulfate | <0.05 |

The physical shape and size of the fiber nodules or pellets provided as a workover plugging product are helpful in making a barrier at the formation face that can be adjusted as to the amount of pressure and fluid loss necessary for different completion and workover operations, and for permitting complete removal with HCl after workover leaving no formation damage and very little loss of production. The substantially complete after workover production capacity has not been feasible with conventional prior art plugging products as shown in the following example.

A large amount of the nodules or pellets are dispersed in the mixing facilities on the surface prior to pumping the product down the well.

The individual fibers themselves and the fiber size (length and diameter) are important factors in forming the mat or filter at the formation face and in conjunction with the polymers making a seal, but not dependent upon the polymer to make the seal. The amount of nodules that are dispersed depends on the speed in which the product is mixed and pumped at the surface facilities on the well site. The less time spent mixing and blending, the more intact nodules are present in the fluid. The porosity (the size of the pore spaces) of the sand or formation face intending to be protected or sealed determines the particle size distribution required to seal the formation face.

The individual fibers are more readily laid down in a mat, in and over the formation face, than the nodules or pellets by themselves. A combination of the fibers and pellets together make an effective mat or filter. We believe it is more descriptive of the actual product in solution to refer to it as 'semi-dispersed pellets'.

EXAMPLE 2

In attempts to treat plugging surfaces after rework on similar down well conditions to obtain the best possible permeability of flow based upon 100% permeability with no plugging surface, it has been ascertained that post-rework HCl treatment of a plugging surface mixture of 25 lbs. per barrel (ppb) of the mineral fibers of this invention with 3 lbs. ppb of hydroxyethylcellulose (HEC) as a sealing agent, a flow of 90 to 94% was obtainable, as compared under equivalent conditions of HCl treatment of a conventional sized calcium carbonate pellet plugging surface of 60% flow and of dissolving sized salt pellets in a plugging surface of 68% flow. Thus, the mineral fiber process of this invention results in greater well production after rework.

The raw materials are processed through a hammermill to reduce them to appropriate pellet sizes with optimum fiber lengths for employment in the sealing layers on the formation faces. The following example sets forth preferred product dimensions.

EXAMPLE 3

Pellets are sized in the range of 1/32 inch in diameter to ½ inch with the average diameter between 1/16 inch to ⅛ inch. The average fiber diameters are between 5 to 15 microns with an average fiber length of between 1/64 inch to ⅜ inch.

The semi-dispersed fiber pellets in a suitable binder form a dense fiber mat across the formation face of the well bore acting as a filter to control the quantity of and to clean the fluid that penetrates the formation. Presence of these semi-dispersed fibrous pellets in a sealing base with a binder material such as the conventional sealing polymer Hydroxyethyl cellulose (HEC) will permit control and regulation of the amount of fluid loss to the formation. A typical example follows.

EXAMPLE 4

The mineral fiber pellets mixed in percentage of weight 25 ppb mineral fiber with 3 ppb HEC and deposited in a layer of 5/32 inch thickness provides a filter permitting a flow of 1.6 ml per minute, per square inch of surface area at a pressure of 1200 psi. Increased thickness reduces the flow as does an increase in density of the layer.

EXAMPLE 5

An example of mineral fiber without using HEC or polymers provides 25 ppb mineral fiber with 0 HEC and deposited in a layer of 8/32 inch thickness provides a filter permitting a flow of 4.36 ml, per minute, per square inch of surface area at a pressure of 500 psi.

This regulatability of the porousness or permeability of the layer is important for use in applying "hydraulic stress" to the formation. This hydraulic stress filter usage is a requirement for holding sand in place during completion and workover operations. Also the product has the significant advantage of solubility in acid so that it can be substantially completely removed leaving no formation damage or significant loss of production.

The product is particularly well adapted for use as a fluid control additive in the completion and workover of wells for the petroleum industry for plugging, controlling sand, killing wells, perforating and the like. It bridges pores at the geological formation face by properly sized acid-soluble semi-dispersed mineral fiber pellets to provide a controllable fluid loss without moving past the face of the formation. The plug may be removed after the job by backflow and/or by degradation of the mineral fiber particles and colloids with acid. Particles larger than one-half the pore size should bridge the pore entrances. With a range of particle sizes the bridge permeability can be reduced. The product forms and stabilizes quickly with colloids or resins forming the plugging layer together with the mineral fibers, thus minimizing any movement of fines into the geological formation face pore system. The product is well adapted for use in controlling sand faces as shown in the following example.

EXAMPLE 6

In sand formations the completion fluid containing the mineral fiber present in the well bore at the time of perforating will come into contact with the geological formation face through the perforations. As more fluid enters the formation, more mineral fiber is carried into the pores creating a dense mat across the formation face. The mineral fiber mat filters the colloids and particles from the fluid reducing the permeability of the perforation and allowing hydrostatic pressure to be applied from the wellbore to the formation. This pressure holds the formation sands in place until the gravel pack can be pumped into the perforation. HCl incorporated into the gravel pack fluid, or pumped prior to the gravel pack fluid, dissolves the mineral fiber in the perforations allowing the gravel pack to hold the formation sands.

It has been shown that the novel product is well adapted for use in well completion, rework and fluid control activities and permits precise control of fluid flow to or from the formation without adding contaminating residuals or substantially reducing production, thereby improving the state of the art.

Accordingly those novel features descriptive of the spirit and nature of the invention are defined with particularity in the following claims.

We claim:

1. A fluid mineral fiber well formation face filter and plugging product for disposing on a down well geological formation face to control porosity comprising in combination, pellets of a chemical constituency including highly acid soluble mineral fibers of between 5 to 15 microns in diameter, with pellets of an average range being between 1/16 inch to ⅛ inch in diameter and with fiber lengths between 1/64 inch to ⅜ inch, which align fibers within the pellets to form with the pellets a down well filter mat at the formation face having a porosity controllable by down well treatment of an acid, and further comprising a binding material of the class including polymers, colloid and resins that form and stabilize quickly to form a dense mat with the soluble mineral fibers.

* * * * *